United States Patent [19]

Fogaroli et al.

[11] Patent Number: 4,549,222
[45] Date of Patent: Oct. 22, 1985

[54] DOT MATRIX PRINTING METHOD AND PRINTER THEREFOR

[75] Inventors: Giuseppe Fogaroli, Ivrea; Giuseppe Coli, Pavone, both of Italy

[73] Assignee: Ing. C. Olivetti & C., S.p.A., Ivrea, Italy

[21] Appl. No.: 471,349

[22] Filed: Mar. 2, 1982

[30] Foreign Application Priority Data

Mar. 4, 1982 [IT] Italy .................................... 82/67245

[51] Int. Cl.⁴ .............................................. H04N 1/22
[52] U.S. Cl. .................................... 358/296; 358/280; 358/263
[58] Field of Search ............... 358/263, 280, 296, 302, 358/284

[56] References Cited

U.S. PATENT DOCUMENTS

| | | | |
|---|---|---|---|
| 4,135,212 | 1/1979 | Pugsley et al. | 358/296 |
| 4,151,562 | 4/1979 | Tregay | 358/263 |
| 4,280,144 | 7/1981 | Bacon | 358/280 |

*Primary Examiner*—Howard W. Britton
*Assistant Examiner*—Victor R. Kostak

*Attorney, Agent, or Firm*—Banner, Birch, McKie & Beckett

[57] ABSTRACT

The method enables images recorded with different definitions to be printed by the same printer, and the information to be printed with maximum print definitions. For this purpose, the print definitions (dots per mm) is a common multiple of the possible recording definitions. The information to be printed is extracted from a signal generator with a frequency corresponding to the recording definition, and is repeated in accordance with the multiple. For example with a print definition of 24 dots/mm defined by a row and column grid L1, L2, etc., C1, C2, etc., a character definition of 8 dots/mm is obtained by printing each dot three times in each row and repeating each row a further two times. The printer, which is therefor suitable for various purposes, for example as a word processor printer and as a facsimile printer, repeatedly prints each dot, along the horizontal and/or along the vertical, for a number of times corresponding to the multiple, to provide a line continuity and an improved image resolution. The printer used may be of electrophotographic type, with the printing element provided by a laser generator.

6 Claims, 6 Drawing Figures

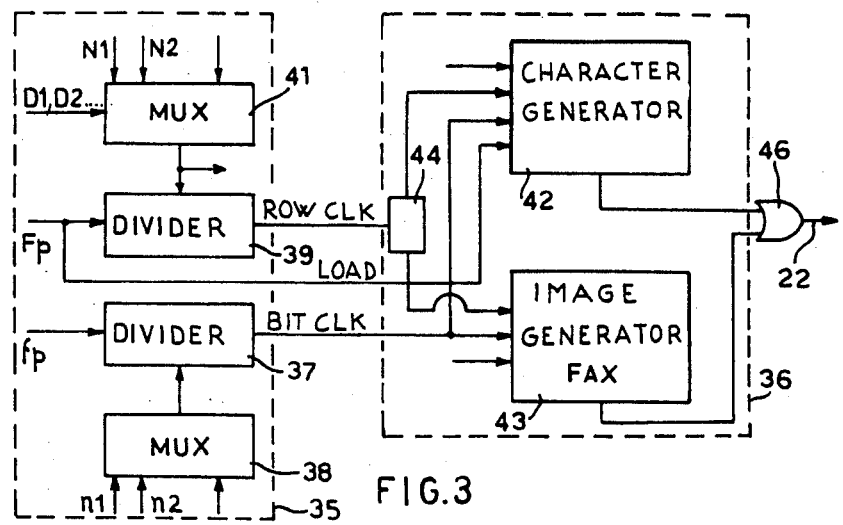
FIG. 3
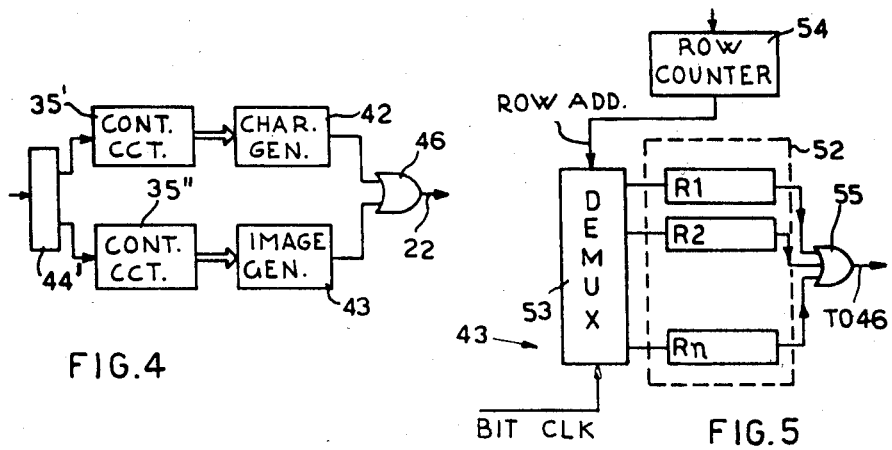
FIG. 4
FIG. 5
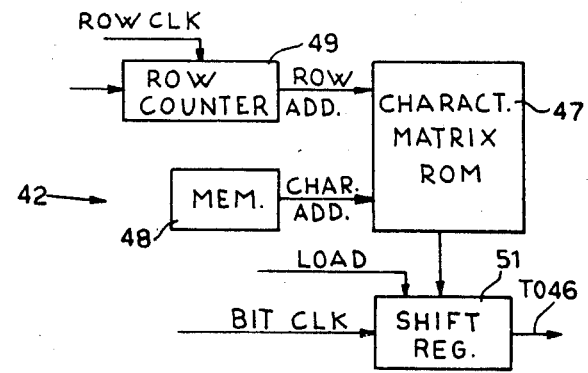
FIG. 6

DOT MATRIX PRINTING METHOD AND PRINTER THEREFOR

BACKGROUND OF THE INVENTION

This invention relates to a method for dot matrix printing of images recorded in accordance with a predetermined definition, and to a printer for implementing the method.

Printers of this type, known as electronic printers, print the information provided by a signal generator or an electronic control system either in the form of alphanumerical characters residing in a memory, or in the form of images which reporduce a configuration of signs received directly from the outside, as in facsimile printing systems. The printing is effected in accordance with a row and column grid, and takes place normally by means of a succession of elementary rows, each of which is composed of a certain number of dots. The fundamental parameter of these printers is the print definition, i.e. the number of dots which can be printed per unit of row or column length.

In known printers, the print definition is generally constant, and depends on the design of the printing element, and is a function of the purpose of the printer.

In particular, for alphanumerical printers used as computer peripherals, the common 7×5 matrix is used corresponding to a definition of about 2.5 dots/mm, whereas for printers for facsimile apparatus a definition of about 8 dots/mm is used, and in the case of word processors a greater definition is preferred, for example of about 12 dots/mm.

Known printers are generally designed for printing images, for example alphanumerical characters recorded in accordance with a single definition, so that they are unsuitable for connection to different apparatus. Moreover, they are arranged to print the images with the same definition with which they are recorded, so that the print quality is poor in the case of low definition. In a known printer, it has already been proposed to improve the print quality by inserting intermediate dots between the dots of a diagonal line. However, this printer cannot be connected to apparatus in which the images are recorded with different definitions.

SUMMARY OF THE INVENTION

The object of the invention is to provide printer in which the resolution of the recorded image can be varied easily without changing the definition of the printed image.

The method according to the invention is characterised in that a printing element is arranged to print the dots in accordance with a grid which along at least one of its two directions has a definition greater than the corresponding definition of the recorded image, and in that the printing element is controlled in such a manner as to repeatedly print in the said direction the dots of the image thus recorded.

This method enables printers to be made available which are able to write with different definitions, which can be changed with ease. The same printer can thus serve for a facsimile apparatus or word processor of high definition, and as a low definition printer. This method also allows the composition of images of different origin and with different definition, even on the same page, for example the reproduction of high definition figures with a text of lower definition, thus saving printing memory and time.

The invention further provides a dot matrix printer operating in accordance with this method, as set forth in claim 5 below.

BRIEF DESCRIPTION OF THE DRAWINGS

The invention will now be described in more detail, by way of example, with reference to the accompanying drawings, in which:

FIG. 3 is a block diagram of a printer control unit;
FIG. 4 shows a modification of the control unit;
FIG. 5 shows a detail of the diagram of FIGS. 3 and 4;
and
FIG. 6 shows a further detail of the diagram of FIGS. 3 and 4.

DESCRIPTION OF THE PREFERRED EMBODIMENT

In electronic printers, the image, whether in the form of alphanumerical characters generated from patterns residing in the electronic control system, or in the form of images which reproduce any configuration of signs received directly from the outside (as in facsimile application), is reproduced on the sheet of paper by printing a very large number of elementary dots which are adjacent to each other and partially superposed, so as to create lines and line portions which are more or less continuous. In this manner, the image which is created or reproduced, and which is integrated both by the printing process and by the visual characteristics of the eye, can assume an appearance of extreme pleasantness and thus, one might say, of high quality, in particular with regard to sharpness of continuity of profiles, contrast, background cleanliness and black line intensity.

Electronic printers can use various techniques, which give rise to well defined classes of printers, such as needle or wire printers, thermographic printers, ink jet printers, electrostatic printers, magnetographic printers and electrophotographic printers. These latter are generally based on the reprographic process, and can use light sources of various types such as lasers, LED arrays, cathode ray tubes with optical fibres, etc. Printing is normally carried out over a succession of one or more elementary lines, each composed of a suitable number of elementary dots.

The basic parameter of dot printers is the print definition, i.e. the number of elementary dots per unit of length in the one and/or other direction of the grid, which normally corresponds to the definition with which the images are recorded, and is usually represented by two values, one relative to the horizontal definition, i.e. parallel to the rows of the grid and thus to the direction in which the individual rows of characters of a text are printed, and the other relative to the vertical definition, i.e. parallel to the grid columns.

A further important parameter which influences the print quality is the size of the individual elementary dot, which according to the definition determines the degree of overlap of the various adjacent dots. A certain degree of overlap between the various dots makes the profile reasonably uniform by reducing the discontinuities which are created when the various elementary dots are disposed side-by-side, particularly in inclined profiles. On the other hand, the greater the degree of overlap the greater the dot size, and thus the greater the minimum line a thickness which can be printed.

The print quality consequently depends on the choice of the two aforesaid parameters for the printer in relation to the type of printing process, and on the mechanical and electronic accuracy and tolerances of the devices which determined the resolution power of the printer, i.e. the minimum thickness of lines or areas which can be printed.

Figure 1:
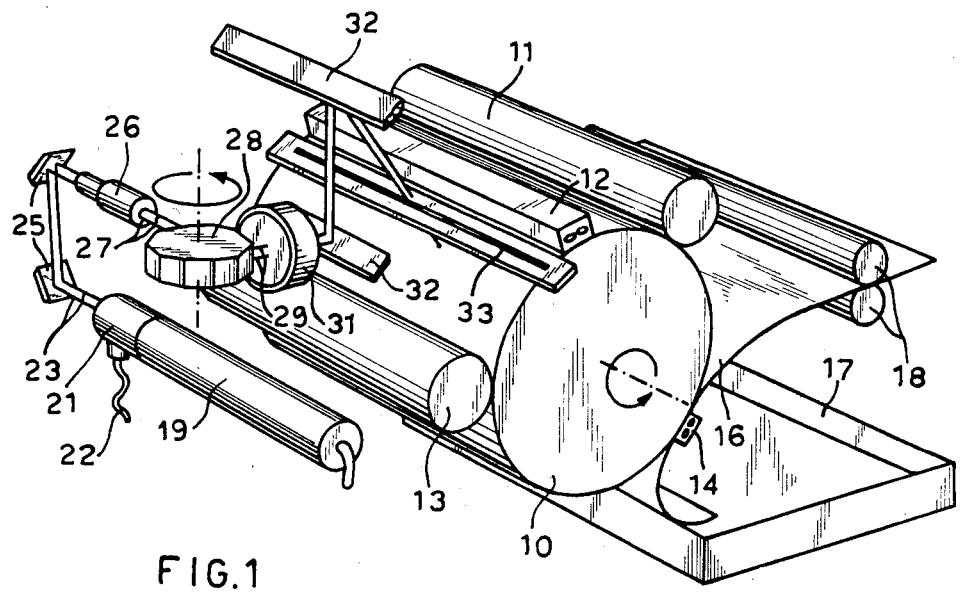
FIG. 1 is a schematic perspective view of an electronic printer.

By way of example, FIG. 1 shows an electrophotographic laser printer which is arranged to print both alphanumerical texts and other images on normal paper. The printer comprises a photoconductor drum 10 rotatable cyclically about its horizontal axis, in the sense indicated by an arrow. The drum 10 cooperates with a cleaning brush 11, a corona charge unit 12, a development unit 13 for applying the toner to the drum 10, and a transfer unit 14 for transferring the image on to a sheet 16 of ordinary paper.

The sheets of plain paper 16 form a stack contained in a tray 17 from which they are taken one at a time and fed into contact with the drum 10. Finally, the image on the sheet 16 is fixed by the fixing unit 18, comprising a pair of pressure rollers. The printer also comprises a high energy light source constituted by a continuous wave laser unit 19, the laser beam 23 of which is modulated into binary form by a modulator 21. This receives through a line 22 binary electrical signals relative to the information to be printed. The modulation consists of slightly deviating the output laser beam 23 when it receives for example a zero signal. The output beam 23 from the modulator 21 is reflected by a pair of mirrors 25, and passes through an expansion unit 26. This comprises an optical system adjusted in such a manner as to define the diameter of the output laser beam 27, which is fed to a reflection prism 28 rotatable about a vertical axis in the sense indicated by an arrow. The beam 29 reflected by the prism 28 then passes through a focusing lens 31, and is reflected by two elongated mirrors 32 on to a slit 33 disposed in a position corresponding with the elementary row of writing, in order to form on the drum 10 dot by dot the latent image of the elementary row. For this purpose the prism 28 is rotated synchronously with the arrival at the line 22 of the signals relative to the printing of one elementary row, in such a manner that one face of the prism 28 scans the entire row by means of the beam 29. The slit 33 is so positioned as to be traversed by the beam 29 only when it is modulated by the signal "1", whereas a beam modulated by the signal "0" is blocked outside the slit 33.

The drum 10 is rotated continuously in such a manner as to advance through one elementary row spacing during the scanning of a row by the prism 28, so that the rows are slightly inclined. As the elementary row spacing is of the order of 0.1 mm, this inclination is imperceptible to the eye.

Normally the printer control signals are fed to the line 22 with a predetermined horizontal scanning frequency, which corresponds to the horizontal definition of the printer and thus to the scheduled definition of the relative signal generator. This is controlled in its turn by a row address signal, which is incremented at each elementary row, i.e. with a frequency which is directly related to the horizontal scanning frequency. By way of example, in a known printer, the expansion unit 26 is so adjusted that the beam 29 creates on the drum 10 a latent image of a dot of diameter about 120$\mu$, whereas the horizontal control frequency is such as to print 8 dots/mm, and the drum advancement is such as to allow printing of 7.7 rows/mm, as required by the facsimile printing standard.

In accordance with the invention, the same printer can print with different horizontal and/or vertical definitions, so adapting the print quality requirements to the characteristics of the control signal generator at any given time. More specifically, this is attained by determining a print grid which at least along one direction has a definition (dots per unit length) which is a multiple of the corresponding definition of the recorded image, and each time repeating the printing of the information in that direction for a number of times corresponding to the said multiple.

If it is required to print images recorded with horizontal definitions d1, d2, etc. and with vertical definitions D1, D2 etc. using the same printer, it is necessary to set the printer so as to print in accordance with a grid of rows L1, L2 etc. (FIG. 2) and columns C1, C2 etc., of which the horizontal definition dp (lines per unit length) is at least equal to the maximum definition d1, d2 etc. of the recording, and of which the vertical definition Dp is at least equal to the maximum definition D1, D2 etc. of the recording. During printing, the information of each elementary dot is repeated along the horizontal a number of times n1=dp/d1, n2=dp/d2 etc., and the information of each elementary line is correspondingly repeated along the vertical a number of times N1=Dp/D1, N2=Dp/D2, etc.

In order to obtain good print quality, (image homogenity and uniformity) and to enable it to be effected easily, it is preferable to define the ratios n and N as the smallest possible whole numbers, so that the two theoretical definitions dp and Dp can be chosen as the minimum common multiple of the required definitions.

Assume for example that it is required to use the printer for the following graphical or alphanumerical applications, in which the definition values are rounded off to whole numbers in order to simplify understanding:

(1) horizontal and vertical definition at 4 dots/mm;
(2) horizontal and vertical definition at 8 dots/mm;
(3) horizontal definition 8 dots mm and vertical defintion 4 lines/mm;
(4) horizontal and vertical definition at 12 dots/mm.

A horizontal definition of 24 dots/mm and a vertical definition of 24 lines/mm are thus chosen for the printing grid.

In printing one row, the printing of one dot is repeated six times in case (1), three times in cases (2) and (3), and twice in case (4), whereas the printing of the individual elementary lines is repeated six times in cases (1) and (3), three times in case (2) and twice in case (4).

It is obvious that the size and the degree of overlap of the individual dots or elementary lines must be chosen compatibly the grid definition. For this purpose, in the printer heretofore described, the optical focusing system is adjusted to provide on the drum 10 a dot of very small diameter, for example about 60$\mu$, and the advancement of the drum 10 is set to allow a number of scannings of rows per mm equal to the required vertical definition for the grid. In this specific case, an advancement equal to 43$\mu$ has been chosen, to allow a vertical definition Dp of 7.7×3=23.1 rows/mm/ The horizontal definition of the grid is defined by the frequency fp of a synchronisation signal which depends on the rotational speed of the prism 28, and is chosen in such a manner as to print the dots at a pitch of 42µ, i.e. with a horizontal definition dp of 23.62 dots/mm.

The printer thus comprises the control signal generator 36 (FIG. 3) arranged to feed the control signals to the line 22 under the control of a frequency synchronisation signal fp, which determines the horizontal definition of the grid, and an elementary row synchronisation signal of frequency Fp.

The control signals are extracted from the generator 36 under the control of bit clock signals generated by a circuit 35. This comprises a divider circuit 37, which is fed by the synchronisation signal at a frequency fp of 1/dp. The circuit 37 is also conditioned by the output of a multiplexer 38, which can be set selectively in known manner according to the pre-chosen horizontal definition d1, d2 . . . and is arranged to correspondingly supply as output the numbers n1=dp/d1, n2=dp/d2, . . . . These numbers determine the counting modulus (or decision factor) of the divider 37. The row synchronisation signal is generated by a further divider circuit 39, which is fed by the row synchronisation signal at a frequency Fp of 1/Dp. The circuit 39 is conditioned by the output of a further multiplexer 41, which can be set according to the pre-chosen vertical definition D1, D2 . . . to supply as output the constants N1=Dp/D1, N2=Dp/D2 . . . , which provide the number of input signals to the divider 39 necessary in order to pass from one row to the next in the signal generator 36.

The signal generator 36 comprises two separate units, a unit 42 for generating the alphanumerical characters and a unit 43 for generating images of facsimile type. The two units 42 and 43 can be selected by means of a selection circuit 44 of any known type, arranged to switch-over the signal originating from the divider 39. The two units 42 and 43 can operate either alternately or simultaneously, so that the respective outputs are connected to the line 22 by way of an OR gate 46.

More specifically, the unit 42 comprises a ROM 47 (FIG. 6) in which are recorded the patterns of the dots which constitute the individual characters, in accordance with a particular row and column matrix. The individual patterns are addressed by a corresponding address of the ROM 47 given by the code of the character to be printed, contained in the printer memory 48. Within each character, the row of dots is addressed by a row address, which is obtained by a counter 49 having a capacity equal to the number of rows provided for the matrix of the characters of the relative ROM 47. The counter 49 is arranged to be incremented each time by the signal emitted by the divider circuit 39. The data of the matrices addressed in each elementary row are loaded in parallel into a shift register 51, under the control of a LOAD signal with frequency Fp synchronously with the printing of the elementary rows. The register 51 is read out serially under the control of the signals provided by the divider circuit 37.

According to the required definition for alphanumerical printing, a specific ROM 47 can be provided, and consequently be removably mounted on the machine. Alternatively, a single ROM 47 can be provided, having different sections which can be selected for the different definitions. The counter 49 can on the other hand be set at the required times together with the multiplexer 41 as a function of the definition scheduled for the ROM 47, in order to emit an elementary row address after a predetermined number of signals received by the divider 39.

The unit 43 comprises an image memory 52 (FIG. 5) operating as a cyclic series of shift registers R1 . . . Rn, each arranged to be loaded with the information relative to the printing of an entire image row. These registers are addressed by means of a demultiplexer 53 under the control of an elementary row address signal generated by a counter 54 analogous to the counter 49, but having a capacity equal to the number of registers of the memory 52. The registers R1, R2 . . . Rn are loaded with the data relative to the image to be printed in a manner which is known, and is therefore not described here.

The registers R1, R2 . . . Rn are read out serially one at a time sequentially under the control of the demultiplexer 53 addressed by the elementary row address signal given by the counter 54. An OR gate 55 feeds the output signal to the OR gate 46 (FIG. 3). The individual registers R1, R2 . . . Rn are read out at each scanning of the elementary row of the image, i.e. each repeatedly re-emitting the same series of bits of data for a number of times equal to the ratio of the vertical print definitions to the image recording definitions, this ratio having been previously defined as follows:
$$Nn=Dp/Dn.$$

It will be assumed that it is required to print alphanumerical characters with a facsimile-type definition, in which the dots are spaced apart horizontally by 125µ (8 dots/mm) and vertically by 129µ (7.7 dots/mm). The printer is then provided with the corresponding ROM 47 (FIG. 6), which for each character of approximate height 3 mm has a pattern in accordance with a 32×32 dot matrix.

The circuit 44 (FIG. 3) is now set in such a manner as to exclude the generator 43, whereas the multiplexer 38 is set to provide a modulus n=3 to the divider 37. This latter consequently generates a bit clock signal for the register 51 every three clock signals received at a frequency of fp. Likewise, the multiplexer 41 is also set to privide a modulus N=3) to the divider 39, which generates a signal of frequency Fp/3 and the counter 49 (FIG. 6) is set to count up to 32, thus allowing scanning of all the rows of the character matrix. The matrix of the pre-chosen ROM 47 has therefore a horizontal and vertical pitch equal to three times that provided for the printer, so that the rows r1, r2, r3 . . . of the matrix of the ROM 47 correspond to the rows L1, L4, L7 . . . of the grid of FIG. 2, while the columns c1, c2, c3 . . . of the matrix correspond to the columns C1, C4, C7 . . . of the grid.

The counter 49 addresses each item a specific row of the matrix of the character selected by the memory 48. The bits addressed in this manner are transferred to the register 51. This latter is shifted under the control of the bit clock given by the divider 37 in order to feed the corresponding signals to the line 22.

It will be assumed that a dot is registered with a bit=1 in row r2 of the matrix, in a position corresponding with column c3 thereof. The row r2 is addressed only when the divider 39 (FIG. 3) provides the fourth pulse of frequency Fp, i.e. when the laser beam 29 explores the row L4 of the grid of FIG. 2. The bit pattern thus addressed is transferred to the register 51 (FIG. 6) and is shifted under the control of the divider 37. As the dot was registered in column c3, the relative bit is shifted when the beam 29 is in a position corresponding with the dot C7 in the grid of FIG. 2. The laser beam 29 is thus controlled by means of the modulator 21 (FIG. 1), in such a manner as to create the latent image of the corresponding dot in a position where L4 crosses C7 of the grid, as indicated by the full-line circle in FIG. 2. As the two successive clock signals received by the divider 37 (FIG. 3) do not influence the output thereof, the register 51 (FIG. 6) is shifted only every third fp pulse and the latent image is repeated both on column C8 and on column C9, as indicated by dashed-line circles in FIG. 2. Because of the diameter of the laser beam, these images are partly superposed, and form practically the image of a continuous line portion running from column C7 to column C9.

Likewise, if in one column, for example c4 of the matrix the absence of a dot is recorded, then the relative bit=0 at the output of the register 51 deviates the laser beam 29 through three successive columns C10–C12, so preventing it from creating the latent image.

Figure 2:
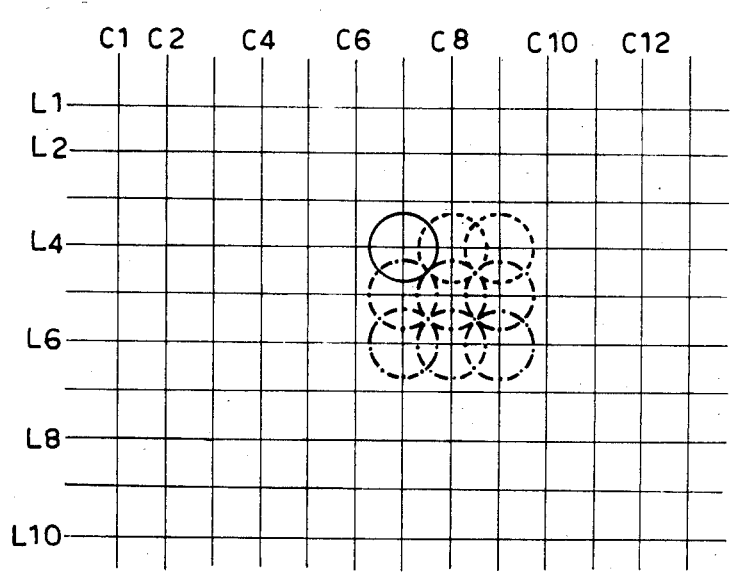
FIG. 2 is a diagram of the print grid.

When scanning of the row L4 is terminated, the prism 28 (FIG. 1) causes the row L5 of the grid of FIG. 2 to be scanned by the beam 29. As the signal of frequency Fp does not yet increment the counter 49 (FIG. 6), this latter addresses the same row 12 of the ROM 47, so that in row L5 the same pattern is printed as for row L4. The same thing occurs during scanning of row L6, from which it is apparent that the recorded pattern is printed repeatedly a number of times equal to the modulus N. The repeated printing of the recorded dot in rows L5 and L6 is indicated in FIG. 2 by chain dotted circles.

It is thus clear that, in this case, the printing of a recorded dot is represented by nine dots, so that the print resolution is considerably increased. If the chosen ROM 46 has a definition of about 12 dots/mm, as required for printing texts in a word processor, each recorded dot is printed in accordance with the grid of FIG. 2 twice along the horizontal, and each row is repeated twice along the vertical. Likewise, if the ROM 47 is recorded with a definition of about 4 dots/mm, each dot is printed in accordance with the dot of FIG. 2 six times along the horizontal and six times along the vertical, and so on.

When it is required to print a graphic image of facsimile type received from a telegraphic line or obtained by local optical scanning, the circuit 44 (FIG. 3) is arranged in such a manner as to exclude the generator 42, and the multiplexers 38 and 41 are set on the basis of the aforesaid definitions. The image was previously recorded in the registers R1, R2 . . . Rn of the memory 52 (FIG. 5) with the horizontal and vertical definitions scheduled for the specific scanning apparatus.

In a manner analogous to the aforegoing, the counter 54 controls the addressing of the elementary row, i.e. of the register R1, R2 . . . Rn which is to be read at any given time, and the divider 37 (FIG. 3) controls the emission of the bits of the addressed register by controlling the modulator 21 by way of the line 22 as in the previous case. Consequently a dot which is recorded with the definition of the facsimile apparatus is printed in accordance with the grid of FIG. 2 repeatedly along the row a number of times equal to the modulus n, while the row is printed repeatedly on a number of elementary rows equal to the modulus N.

The circuit 44 (FIG. 3) can be either set or programmed in such a manner as to automatically switch-over between controlling the alphanumerical signal generator 42 and controlling the facsimile signal generator 43 only if the definition of the recordings of the unit 42 is equal to that of the unit 43. In this case, switching over can be also effected as a function of the page zone to be printed, either in order to print a text and an image on different zones of the page during a single revolution of the drum 10 (FIG. 1) or to print a text and an image (for example a diagram) on the same page zone.

In order to be able to simultaneously print a text and a facsimile image even with different definitions, then according to one modification of the invention, each unit 42 and 43 is connected to a corresponding circuit 35' and 35" (FIG. 4) analogous to the circuit 35 of FIG. 3. In this manner, different moduli for the two circuits 35' and 35" (FIG. 4) can be previously fixed according to the definitions of the units 42 and 43, and a circuit 44' can be arranged to control the extraction of the patterns from one or from both of these units, of which the outputs are connected to the line 22 by way of the OR gate 46.

In this manner, alphanumerical data generated locally or data originating from the facsimile line with different definitions can be printed on one and the same document either alternately or simultaneously, and in the limit with superimposing of the images. It is apparent that in all cases printing is carried out in accordance with the grid of FIG. 2, so that the lines are more or less continuous, the images are sharper and the print intensity is much greater than known printers which reproduce only the recorded dots.

Various modifications and improvements can be made to the invention within the scope of the claims. For example, the divider 37 and/or 39 can be dispensed with, and the corresponding multiplexer 37 and/or 41 be arranged to directly provide, in accordance with the chosen definition, the required frequencies f1, f2 . . . and F1, F2 . . . , and the moduli n1, n2 . . . and N1, N2 . . . In addition, the memory 52 can be a RAM or a series of cyclically addressed shift registers R1, R2 . . . Rn.

Finally, the printer can be replaced by any other dot printer by applying the control signals in accordance with the number and arrangement of the printing elements. For example, the continuous laser unit 19, 21 can be replaced by a modulated laser unit by eliminating the unit 26.

We claim:

1. A dot printer operable for printing an image recorded in accordance with a pair of predetermined definitions associated to a pair of perpendicular directions on the original image, said printer including a printing element conditionable at a control frequency for printing the dots in accordance with a matrix having along at least one of said directions a definition multiple of the corresponding definition by which the original image has been recorded, signal generating means for generating electrical signals corresponding to the bits of the recorded image, signal extracting means conditionable for extracting said signals from said signal generating means in sequence, a pair of frequency generating circuits associated with said directions and arranged for selectively defining in the corresponding direction said multiple, each circuit conditioning said extracting means to extract said signals from said signal generating means with an extraction frequency such that the ratio of said control frequency to said extraction frequency is equal to said multiple, and a pair of frequency dividers associated with said directions and each one controlled by said frequency generating circuit for so conditioning said extracting means, whereby said printing element prints in said directions for each extracted signal a number of dots equal to said multiple so that the images recorded upon being scanned according to one of a plurality of definitions is printed according to said multiple definition.

2. A printer as claimed in claim 1, characterised in that the signal generating means (42) comprises a shift register (51) arranged to store at any given time the code of at least one portion of row to be printed, the register being shifted under the control of one of the frequency dividers (37), the other frequency divider (39) being arranged to increment a row counter (49) in order to provide the signal generating means at any given time with an address of the elementary row of dots to be printed.

3. A printer as claimed in claim 1, having a read-only memory (47) for generating alphanumerical characters in accordance with a dot matrix, said first signal generator being associated with first frequency generating circuit (35') settable according to the definition of the dot matrix, and wherein said signal generating means include a second signal generator (43) for generating signals in accordance with the dots of a facsimile image, and which is controlled by second frequency generating circuit (35") settable according to the definition of the facsimile image, and wherein selecting means (44') are operable for controlling the printing element (21) selectively in accordance with the two frequency generating circuits.

4. A printer as claimed in claim 1, wherein said signal generating means include a first signal generator (42) comprising a read-only memory (ROM) (47) mounted removably on the printer and recorded with a series of alphanumerical characters in the form of dots in accordance with a matrix having a pair of predetermined definitions.

5. A printer as claimed in claim 4, wherein said signal generating means also include a second signal generator (43) also comprising memory means (52) stored in accordance with the dots of a facsimile image under the control of the frequency dividers (37,39), and wherein selecting means (44,46) are operable for controlling the printing element (21) selectively in accordance with the signals extracted from the ROM (47) and from the memory means (52).

6. A printer as claimed in claim 5, characterised in that the memory means (52) operates as a series of shift registers (R1–Rn), each arranged to record an elementary row of dots to be printed, means (53) being provided for sequentially addressing the registers for the extraction of the recorded dots.

* * * * *